US011624660B1

(12) United States Patent
Russo et al.

(10) Patent No.: US 11,624,660 B1
(45) Date of Patent: Apr. 11, 2023

(54) DYNAMIC RADIOMETRIC THERMAL IMAGING COMPENSATION

(71) Applicant: MOTOROLA SOLUTIONS, INC., Chicago, IL (US)

(72) Inventors: Pietro Russo, Melrose, MA (US); Peter L. Venetianer, McLean, VA (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 17/451,130

(22) Filed: Oct. 15, 2021

(51) Int. Cl.
| | |
|---|---|
| *H04N 7/18* | (2006.01) |
| *G01J 5/10* | (2006.01) |
| *G06K 9/62* | (2022.01) |
| *G06T 7/11* | (2017.01) |
| *G06T 7/50* | (2017.01) |
| *H04N 5/247* | (2006.01) |
| *B64C 39/02* | (2023.01) |
| *B64D 47/08* | (2006.01) |

(Continued)

(52) U.S. Cl.
CPC .............. *G01J 5/10* (2013.01); *B64C 39/024* (2013.01); *B64D 47/08* (2013.01); *G01J 5/53* (2022.01); *G06K 9/6267* (2013.01); *G06T 7/11* (2017.01); *G06T 7/50* (2017.01); *G06V 10/147* (2022.01); *G06V 10/95* (2022.01); *G06V 20/10* (2022.01); *G06V 30/274* (2022.01); *H04N 5/247* (2013.01); *H04N 7/183* (2013.01); *B64C 2201/127* (2013.01); *G01J 5/802* (2022.01); *G01J 5/804* (2022.01); *G01J 2005/0077* (2013.01); *G06T 2207/10048* (2013.01); *G06T 2207/20084* (2013.01); *G06V 10/16* (2022.01)

(58) Field of Classification Search
None
See application file for complete search history.

(56) References Cited

U.S. PATENT DOCUMENTS

| | | |
|---|---|---|
| 5,272,340 A | 12/1993 | Anbar |
| 7,186,978 B2 | 3/2007 | Bevan et al. |
| 2006/0232675 A1 | 10/2006 | Chamberlain et al. |

(Continued)

OTHER PUBLICATIONS

Wang et al., "Equipment Monitoring Using Thermography Cameras: Remote Detection of Temperature-Related Failures," in IEEE Industry Applications Magazine, vol. 23, No. 4, pp. 35-44, Jul.-Aug. 2017.

(Continued)

*Primary Examiner* — Eileen M Adams
(74) *Attorney, Agent, or Firm* — Michael Best & Friedrich LLP (57) ABSTRACT

Systems and methods for dynamic radiometric thermal imaging compensation. The method includes analyzing a visible light image to determine an emissivity value for each of a plurality of visible light pixels making up the visible light image. The method includes associating each of the plurality of thermal pixels making up a thermal image corresponding to the visible light image with at least one of the plurality of visible light pixels making up the visible light image. The method includes generating a second thermal image by, for each of the plurality of thermal pixels making up the thermal image, determining a temperature value based on the thermal pixel value of the thermal pixel and the emissivity value of the at least one of the plurality of visible light pixels associated with the thermal pixel.

20 Claims, 7 Drawing Sheets

(51) Int. Cl.
  *G01J 5/53* (2022.01)
  *G06V 10/94* (2022.01)
  *G06V 10/147* (2022.01)
  *G06V 20/10* (2022.01)
  *G06V 30/262* (2022.01)
  *G01J 5/00* (2022.01)
  *G01J 5/80* (2022.01)
  *G06V 10/10* (2022.01)

(56) References Cited

U.S. PATENT DOCUMENTS

| | | | |
|---|---|---|---|
| 2012/0320189 A1 | 12/2012 | Stuart et al. | |
| 2016/0295208 A1* | 10/2016 | Beall | G06T 7/20 |
| 2019/0212760 A1* | 7/2019 | Tiwari | G06Q 10/08 |
| 2022/0291701 A1* | 9/2022 | Posch | G08G 5/0021 |

OTHER PUBLICATIONS

Badrinarayanan et al., "SegNet: A Deep Convolutional Encoder-Decoder Architecture for Image Segmentation," IEEE Transactions on Pattern Analysis and Machine Intelligence, vol. 39, No. 12, pp. 2481-2495, Dec. 1, 2017.

Brandão et al., "Material recognition CNNs and hierarchical planning for biped robot locomotion on slippery terrain," 2016 IEEE-RAS 16th International Conference on Humanoid Robots (Humanoids), 2016, pp. 81-88.

FLIR, "User's manual FLIR T8xx series," <https://pim-resources.coleparmer.com/instruction-manual/39753-22-29-t8xx-user-manual-en-us-usl.pdf> dated Feb. 12, 2019 (268 pages).

Infrared Training Center, "FLIR C5 QuickStart Tutorial," <https://www.youtube.com/watch?app=desktop&v=IRCseJUONFg> dated Jun. 29, 2020.

* cited by examiner

DYNAMIC RADIOMETRIC THERMAL IMAGING COMPENSATION

BACKGROUND OF THE INVENTION

Thermal imaging cameras sense thermal radiation emitted from objects. Sensed thermal radiation values are processed to produce images of the objects, in which variations in pixel color are used to represent changes in thermal radiation relative to other pixels in the images. Thermal radiation values can be used to calculate the temperature of the objects, making thermal images useful for measuring and monitoring the temperature of objects instantaneously or over a period of time.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments illustrated.

In some instances, the apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Thermal imaging cameras detect thermal energy by sensing infrared radiation, for example, in the long-wave infrared (LWIR) spectrum. They convert the infrared radiation, which is not visible to the human eye, into visible images. The images depict objects in terms of relative thermal radiation, for example, by displaying the pixels that make up the objects using different colors to represent different levels of thermal radiation.

Thermal imaging cameras can be used to create radiometric images, which include temperature data embedded in each pixel. Radiometric images of objects and their surroundings may be used to measure and monitor temperature. Radiometric images and image streams, in turn, may be used to monitor objects or environments where temperature changes indicate an underlying condition. For example, human beings can be monitored for signs of illness, facilities can be monitored for human or animal intruders, electrical systems can be monitored for current overload, heating or cooling systems can be monitored to be sure they are operating within parameters, structures can be monitored for signs of fire, and the like.

However, thermal imaging cameras cannot measure temperature values directly because sensed thermal radiation values are not equivalent to temperature values. To determine the temperature of an object based on its radiated thermal energy, the emissivity of the object's surface must be known. Emissivity is the measure of a material's ability to emit thermal radiation. Emissivity is defined as the ratio of the energy radiated from a material's surface to that radiated from a perfect emitter, known as a blackbody, at the same temperature and wavelength and under the same viewing conditions. Emissivity may therefore be expressed in terms of a percentage, ranging from 0% to 100%, with 0% representing no radiation and 100% being equivalent to a perfect emitter. As understood by one skilled in the art, the temperature value for a surface can be determined using, among other factors, the thermal radiation value for the surface and the emissivity value for the material that makes up the surface. Other factors, such as the distance to the thermal imager, the angle relative to the thermal imager, atmospheric pressure, relative humidity, and ambient temperature can also affect the accuracy of the temperature measurement. In the determination of temperature, emissivity is a scalar multiplier. In addition, emissivity values can vary greatly depending on what objects are being imaged within a given area being sensed by a thermal imager. For example, aluminum foil has an emissivity of 3%, wood has an emissivity of 85%, pure water has an emissivity of 96%, and human skin has an emissivity of 98%. Emissivity makes the most significant contribution to the determination of temperature based on sensed thermal radiation values.

To address these concerns (e.g., the significance of emissivity to the determination of temperature), existing thermal imaging systems require users to input emissivity values for particular materials of interest in order to produce accurate temperature measurements. For example, a thermal imager used to monitor human beings for body temperature variations is configured to assume an emissivity value for human skin. While this produces accurate temperature measurements for human beings in the images, it is not possible to take accurate temperature measurements of any other surfaces present in the images. Similarly, the presence of clothing and other skin coverings (for example, facemasks) may lead to inaccurate temperature measurements for some of the human beings in the images.

In addition, some existing thermal imaging systems must assume a static environment in order to produce accurate temperature readings. For example, a thermal imager used to monitor electronic equipment for signs of heat buildup is configured to assume an emissivity value for the surface of the equipment being monitored (for example, a painted metal housing for a computer server array). Such systems are unable to account for changes in the environment (for example, a worker entering the environment, existing equipment being moved within the environment, the surface materials of existing equipment being changed, or new equipment or other objects being added to the environment).

Other existing thermal imaging systems require the presence of a "blackbody" (i.e., a reference object with a known emissivity value) within the field of view of the thermal imager to calibrate their temperature measurements.

As thermal imaging cameras are becoming physically smaller, less expensive, and able to detect wider ranges in temperature, they are increasingly deployed to measure and monitor temperature as noted herein. However, as noted, existing thermal imaging systems rely on users to enter the correct emissivity values and assume that those values remain constant over time. Similarly, existing systems are unable to measure temperature for a variety of different types of objects unless static regions of interest are predefined and manually assigned respective static emissivity values. When a thermal imager is re-deployed to a new environment, or the thermal imager's environment changes, new static emissivity values must be entered and new regions of interest, as applicable, must be defined. Predefining regions of interest is time consuming and inefficient for static environments, and impossible for changing environments and moving cameras.

To address, among other things, these problems, systems and methods are provided herein for dynamic radiometric thermal imaging compensation. Among other things, embodiments provided herein utilize a visible light imager in conjunction with a thermal imager to automatically determine the emissivity values for objects within the imagers' fields of view. Embodiments presented herein use image processing techniques and trained machine learning engines (for example, deep neural networks) to detect and classify objects in captured images and automatically assign emissivity values, based on the detected objects, to the pixels in the images. The emissivity values are used to generate radiometric images that provide accurate temperature readings throughout the image without the need for predefined emissivity values or blackbody references. In addition, some embodiments presented herein automatically determine three-dimensional aspects (for example, distance and angle) of the objects being monitored and use those aspects to further refine the temperature measurements.

Using such embodiments, thermal imagers may be quickly deployed into new environments without manually defining emissivity values. Additionally, using such embodiments, thermal imaging systems can automatically measure the temperatures of multiple objects, and multiple surfaces of the objects, without reconfiguration, as monitored environments change. These advantages enable such systems to enhance monitoring levels. For example, existing systems monitor electrical equipment using static regions of interest, which focus on potential failure points. Using the embodiments presented herein, multiple portions of the equipment can be monitored for failure without the need for specifying particular regions of interest. These advantages also enable such systems to be deployed ad hoc for use in dynamic environments, such as, for example, public safety incident responses. These advantages also enable such systems to be deployed in a mobile configuration, such as, for example, in an unmanned aerial vehicle (UAV).

Some embodiments described herein also allow a user or operator to set a temperature threshold for a specific material type, which allows the system (for example, in mobile applications) to automatically monitor the material based on detecting the material type.

Certain embodiments presented herein improve the functioning of thermal imaging systems by increasing the accuracy of their temperature measurements and expanding their measurement capabilities. Such embodiments also provide for more efficient use of associated communications and computing infrastructure by reducing the time and tasks necessary to deploy and operate thermal imaging systems.

One example embodiment provides an electronic imaging device. The device includes a thermal imager having a first field of view, a visible light imager having a second field of view overlapping the first field of view, and an electronic processor coupled the thermal imager and the visible light imager. The electronic processor is configured to receive, from the visible light imager, a visible light image of a scene, the visible light image including a visible light image overlap section. The electronic processor is configured to analyze the visible light image to determine an emissivity value for each of a plurality of visible light pixels making up the visible light image, wherein the emissivity value corresponds to an emissivity ratio for a material depicted by the visible light pixel. The electronic processor is configured to receive, from the thermal imager, a thermal image of the scene, the thermal image including a thermal image overlap section that corresponds to the visible light image overlap section, the thermal image including a plurality of thermal pixels, each of the plurality of thermal pixels having a thermal pixel value. The electronic processor is configured to associate each of the plurality of thermal pixels making up the thermal image overlap section with at least one of the plurality of visible light pixels making up the visible light image overlap section. The electronic processor is configured to generate a second thermal image by, for each of the plurality of thermal pixels making up the thermal image overlap section, determining a temperature value based on the thermal pixel value of the thermal pixel and the emissivity value of the at least one of the plurality of visible light pixels associated with the thermal pixel.

Another example embodiment provides a method for dynamic radiometric thermal imaging compensation. The method includes receiving, from a visible light imager having a first field of view, a visible light image of a scene, the visible light image including a visible light image overlap section. The method includes analyzing, with an electronic processor, the visible light image to determine an emissivity value for each of a plurality of visible light pixels making up the visible light image, wherein the emissivity value corresponds to an emissivity ratio for a material depicted by the visible light pixel. The method includes receiving, from a thermal imager having a second field of view overlapping the first field of view, a thermal image of the scene, the thermal image including a thermal image overlap section that corresponds to the visible light image overlap section, the thermal image including a plurality of thermal pixels, each of the plurality of thermal pixels having a thermal pixel value. The method includes associating, with the electronic processor, each of the plurality of thermal pixels making up the thermal image overlap section with at least one of the plurality of visible light pixels making up the visible light image overlap section. The method includes generating, with the electronic processor, a second thermal image by, for each of the plurality of thermal pixels making up the thermal image overlap section, determining a temperature value based on the thermal pixel value of the thermal pixel and the emissivity value of the at least one of the plurality of visible light pixels associated with the thermal pixel.

Yet another example embodiment provides an unmanned aerial vehicle capable of dynamic radiometric thermal imaging. The unmanned aerial vehicle includes a thermal imager having a first field of view, a visible light imager having a second field of view overlapping the first field of view, and an electronic processor coupled the thermal imager and the visible light imager. The electronic processor is configured to receive, from the visible light imager, a visible light image of a scene, the visible light image including a visible light image overlap section. The electronic processor is configured to analyze the visible light image to determine an emissivity value for each of a plurality of visible light pixels making up the visible light image, wherein the emissivity value corresponds to the emissivity ratio for a material depicted by the visible light pixel. The electronic processor is configured to receive, from the thermal imager, a thermal image of the scene, the thermal image including a thermal image overlap section that corresponds to the visible light image overlap section, the thermal image including a plurality of thermal pixels, each of the plurality of thermal pixels having a thermal pixel value. The electronic processor is configured to associate each of the plurality of thermal pixels making up the thermal image overlap section with at least one of the plurality of visible light pixels making up the visible light image overlap section. The electronic processor is configured to generate a second thermal image by, for each of the plurality of thermal pixels making up the thermal image overlap section, determining a temperature value based on the thermal pixel value of the thermal pixel and the emissivity value of the at least one of the plurality of visible light pixels associated with the thermal pixel.

For ease of description, some or all of the example systems presented herein are illustrated with a single exemplar of each of its component parts. Some examples may not describe or illustrate all components of the systems. Other example embodiments may include more or fewer of each of the illustrated components, may combine some components, or may include additional or alternative components.

It should be understood that although certain figures presented herein illustrate hardware and software located within particular devices, these depictions are for illustrative purposes only. In some embodiments, the illustrated components may be combined or divided into separate software, firmware, and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

Figure 1:
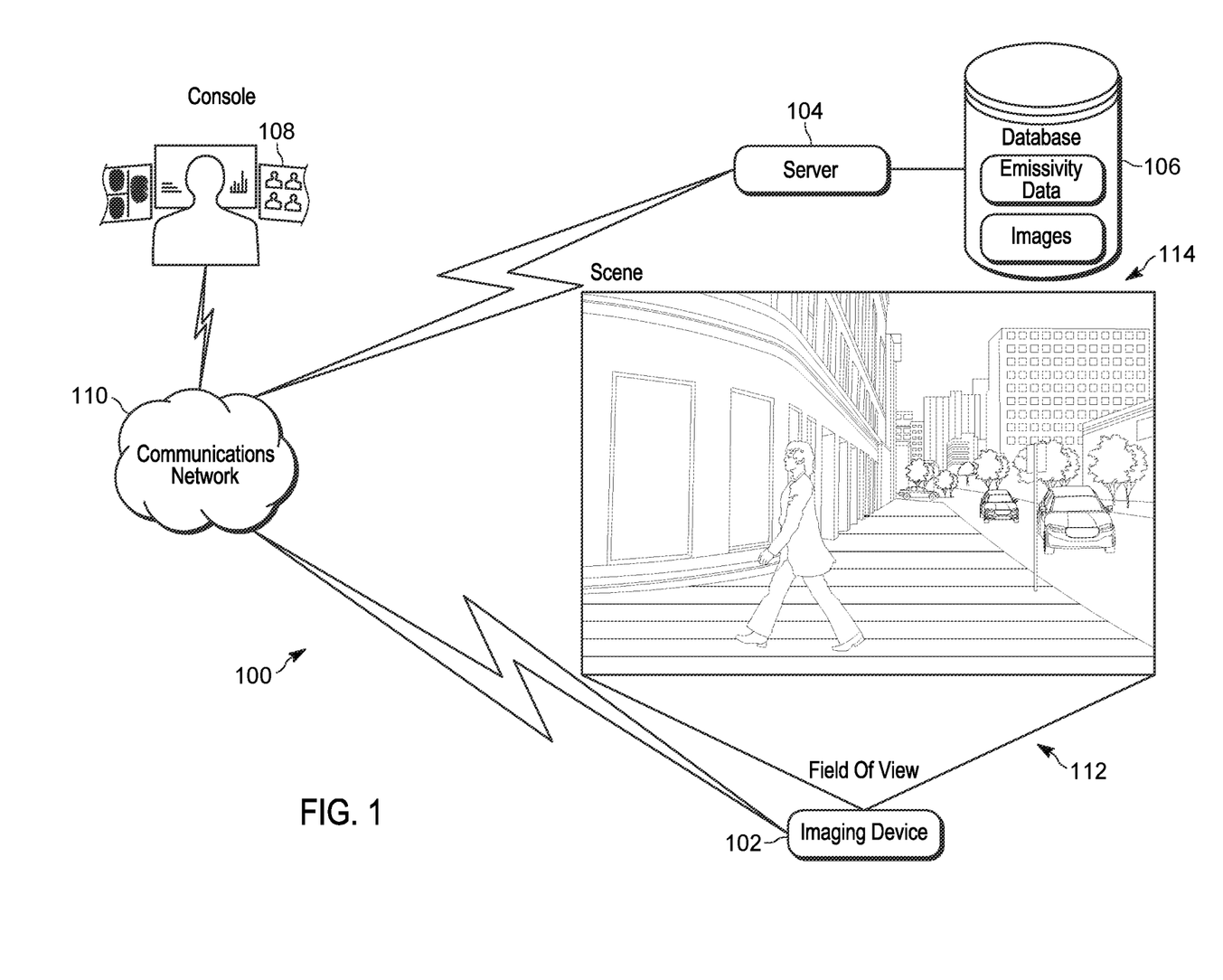
FIG. 1 illustrates a system for capturing thermal and visible light images in accordance with some embodiments.

FIG. 1 is a diagram of one example embodiment of a thermal imaging system 100. In the example illustrated, the system 100 includes an imaging device 102, a server 104, a database 106, and a console 108.

The imaging device 102, server 104, database 106, and console 108, are communicatively coupled to one another. In the illustrated embodiment, they are coupled via a communications network 110. The communications network 110 is a communications network including wireless connections, wired connections, or combinations of both. The communications network 110 may be implemented using various local and wide area networks, for example, a Bluetooth™ network, a Wi-Fi™ network), the Internet, a cellular data network, a Long Term Evolution (LTE) network, a 4G network, a 5G network, or combinations or derivatives thereof.

Figure 2:
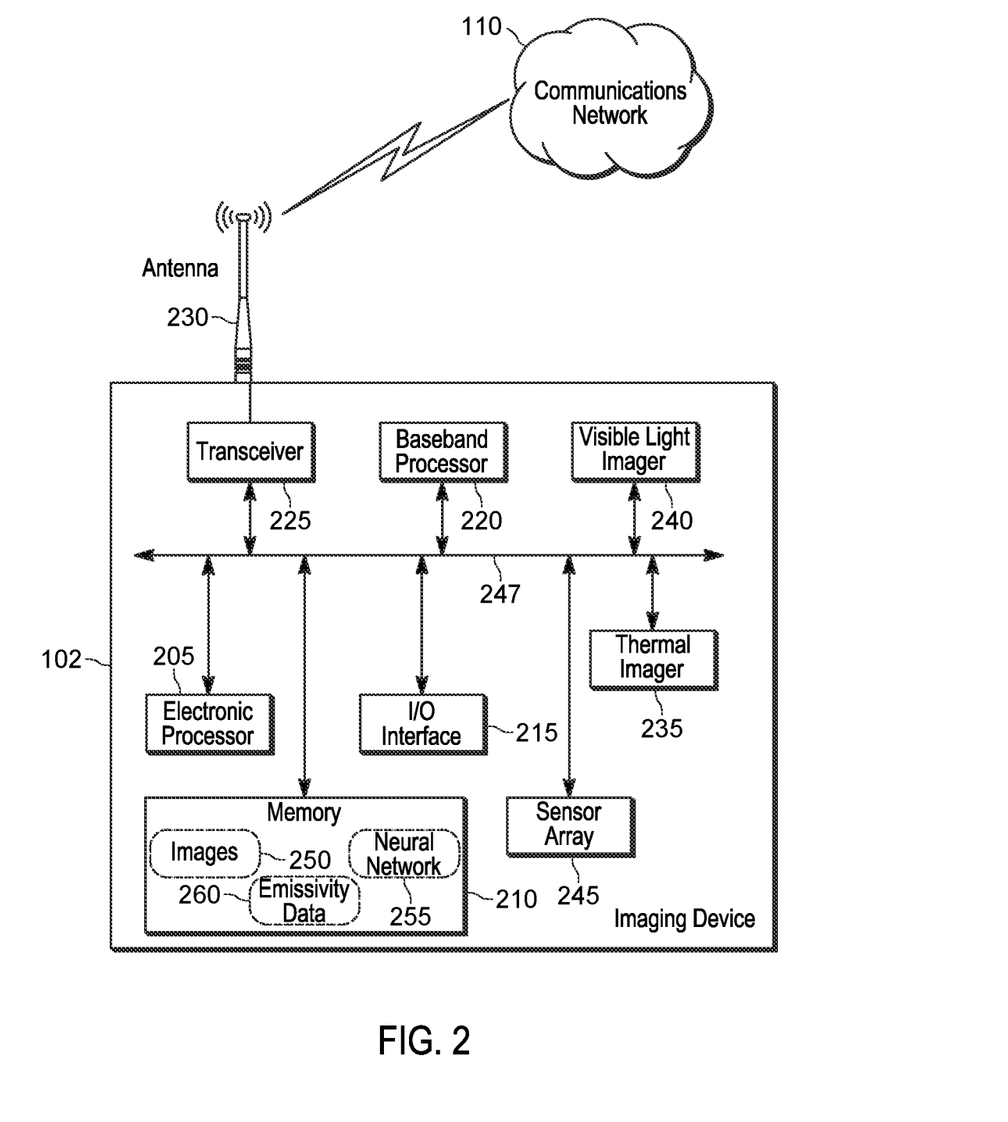
FIG. 2 is a diagram of an imaging device of the system of FIG. 1 in accordance with some embodiments.

The imaging device 102, described more particularly with respect to FIG. 2, is an electronic device configured to capture visible light images and thermal images within its field of view 112 such as, for example, the scene 114. As described elsewhere herein, the field of view 112 may include multiple overlapping fields of view for multiple imagers of the imaging device 102. As used herein, the term "scene" refers to a real-world environment that may include one or more objects. Objects may include human beings, animals, trees and other vegetation, vehicles, structures, equipment, the ground, and other things present in the environment. As used herein, the terms "image" and "images" may refer to one or more digital visible light or thermal images captured or produced by the imaging device 102. Further, the terms "image" and "images," as used herein, may refer to still images or sequences of images (for example, a video stream). As described herein, the imaging device 102 is configured to, among other things, produce radiometric images of the scene 114 based on automatically-determined emissivity values for the objects present in the scene 114.

In some embodiments, the server 104 and the database 106 operate to, among other things, receive, process, and display images captured by and received from the imaging device 102. In some embodiments, the server 104 is a computer server including at least an electronic processor, a memory, and a communication interface. In some embodiments, the server 104 enables display of images remotely, for example, using a display of the console 108. In some embodiments, the server 104 operates using, among other things, augmented reality technology, where video streams captured by the imaging device 102 are displayed (for example, on the console 108) with text, graphics, or graphical user interface elements superimposed on or otherwise combined with the video stream's images.

The server 104 is communicatively coupled to, and writes data to and from, the database 106. In the illustrated embodiment, the database 106 is an electronic database housed on a suitable database server communicatively coupled to and accessible by the server 104. In some embodiments, the server 104 and the database 106 are individually or both part of a cloud-based system external to the system 100 and accessible by the system 100 over one or more wired or wireless networks. In some embodiments, all or part of the database 106 is locally stored on the server 104.

As illustrated in FIG. 1, in some embodiments the database 106 electronically stores emissivity data and image data.

Emissivity data includes emissivity values for various materials, images of which are captured by the imaging device 102. In some embodiments, the imaging device 102 locally stores emissivity data. Image data includes visible light and thermal images captured by imaging device 102 and transmitted to the server 104, the console 108, or both. Image data also includes radiometric images produced by the imaging device 102, the server 104, or both, as described herein.

In some embodiments, the server 104 and the database 106 are part of a public safety computer-aided dispatch system, a governmental or private security and access control system, or another suitable system for measuring and monitoring temperatures at remote scenes. The console 108 is a computer terminal operated by an operator. In some embodiments, the console 108 is a computer that includes an electronic processor (for example, a microprocessor, or other electronic controller), a memory, a network interface, and a suitable electronic display for presenting images to an operator.

FIG. 2 illustrates an example of the imaging device 102. In the embodiment illustrated, the imaging device 102 includes an electronic processor 205, a memory 210, an input/output interface 215, a baseband processor 220, a transceiver 225, an antenna 230, a thermal imager 235, a visible light imager 240, and a sensor array 245. The illustrated components, along with other various modules and components are coupled to each other by or through one or more control or data buses (for example, the bus 247) that enable communication therebetween. The use of control and data buses for the interconnection between and exchange of information among the various modules and components would be apparent to a person skilled in the art in view of the description provided herein.

The electronic processor 205 obtains and provides information (for example, from the memory 210 and/or the input/output interface 215), and processes the information by executing one or more software instructions or modules, capable of being stored, for example, in a random access memory ("RAM") area of the memory 210, a read only memory ("ROM") of the memory 210, or another non-transitory computer readable medium (not shown). The software can include firmware, one or more applications, program data, filters, rules, one or more program modules, and other executable instructions. The electronic processor 205 is configured to retrieve from the memory 210 and execute, among other things, software related to the capture and processing of visible light images and thermal images, as described herein.

The memory 210 can include one or more non-transitory computer-readable media and includes a program storage area and a data storage area. In the embodiment illustrated, the memory 210 stores, among other things, images 250, a neural network 255, and emissivity data 260 (all described herein).

The input/output interface 215 is configured to receive input and to provide system output. The input/output interface 215 obtains information and signals from, and provides information and signals to, (for example, over one or more wired and/or wireless connections) devices both internal and external to the imaging device 102.

The electronic processor 205 is configured to control the baseband processor 220 and the transceiver 225 to transmit and receive wireless communications (including images) to and from the imaging device 102. The baseband processor 220 encodes and decodes digital data sent and received by the transceiver 225. The transceiver 225 transmits and receives radio signals to and from, for example, the communications network 110 using the antenna 230. The electronic processor 205, the baseband processor 220, and the transceiver 225 may include various digital and analog components, which for brevity are not described herein and which may be implemented in hardware, software, or a combination of both. Some embodiments include separate transmitting and receiving components, for example, a transmitter and a receiver, instead of a combined transceiver 225. In some embodiments, the imaging device 102 lacks some or all of the components described herein for enabling wireless communications and communicates via a wired connection, for example, using aspects of the input/output interface 215.

The thermal imager 235 is a thermal image capture device for capturing thermal images and video streams by sensing, in some embodiments, long-wave infrared (LWIR) radiation (for example, emitted by objects present in the scene 114). The thermal imager 235 communicates the captured thermal images and video streams to the electronic processor 205 for processing as described herein.

The visible light imager 240 is an image capture device for capturing visible light images and video streams (including, for example, a portion of or the entire scene 114) by sensing light (for example, with a CCD (charged coupled device) sensor, a CMOS (complementary metal-oxide-semiconductor) sensor, or another suitable sensor) in at the visible portion of the electromagnetic spectrum. The visible light imager 240 communicates the captured images and video streams to the electronic processor 205 for processing as described herein.

As illustrated, the thermal imager 235 and the visible light imager 240 are integrated into the imaging device 102. The thermal imager 235 and the visible light imager 240 and their respective accessory structures, including lenses, (not shown) are positioned in the imaging device 102 such that the field of view for the thermal imager 235 overlaps the field of view for the visible light imager 240. In some embodiments, the thermal imager 235 and the visible light imager 240 are positioned such that they have substantially identical fields of view. This positioning enables the thermal imager 235 and the visible light imager 240 to simultaneously capture images that include the same portion of an area, for example, the scene 114.

In alternative embodiments, the visible light imager 240, the thermal imager 235, or both may be separate from the imaging device 102 and communicate captured images to the imaging device 102 via a wired or wireless connection. In such embodiments, the thermal imager 235 and the visible light imager 240 are also positioned such that they have overlapping or substantially identical fields of view.

In some embodiments, the electronic processor 205 is configured to use the visible light imager 240 in conjunction with the thermal imager 235 as a stereoscopic camera, to determine three-dimensional information about the scene 114. In some embodiments, the electronic processor 205 is configured to determine three-dimensional information about the scene 114 using structure from motion methods and images captured from the visible light imager 240, the thermal imager 235, or both. In some embodiments, the electronic processor 205 is configured to determine three-dimensional information about the scene 114 using the sensor array 245.

In some embodiments, the imaging device 102 includes a sensor array 245, which includes a plurality of sensors for sensing conditions in and characteristics of the scene 114. In some embodiments, the sensor array 245 includes radar sensors or infrared ranging sensors for determining three-dimensional information about the scene 114. In some embodiments, the sensor array 245 includes sensors capable of sensing the atmospheric pressure, ambient (air) temperature, and relative humidity in and around the scene 114. In some embodiments, the sensor array 245 includes motion sensors and rotation sensors, which the electronic processor 205 can use to perform image stabilization or other image processing to compensate for movement of the imaging device 102.

In some embodiments, the imaging device 102 includes a geolocation system (for example, a global positioning system (GPS) receiver) (not shown), which the electronic processor 205 can use to determine the geographic location of the imaging device 102.

In some embodiments, the imaging device 102 includes a suitable electronic display such as, for example, a liquid crystal display (LCD) touch screen, or an organic light-emitting diode (OLED) touch screen. In such embodiments, the imaging device 102 may implement a graphical user interface (GUI) (for example, generated by the electronic processor 205, from instructions and data stored in the memory 210, and presented on the display) that enables a user to interact with the imaging device 102.

By way of example, the imaging device 102 is presented herein as part of the system 100 (see FIG. 1). However, it should be understood that embodiments of the imaging device 102, as described herein, are capable of operating independently of the system 100, for example, as a stand-alone thermal imaging camera operated by a single user. For example, in some embodiments, the imaging device 102 is configured to store and display visible, thermal, and other images locally. In other embodiments, the imaging device 102, or components thereof, configured to operate as described herein, may be integrated into other devices. For example, an unmanned aerial vehicle (UAV) may include an embodiment of the imaging device 102 (for example, as a payload or incorporated into the UAV) for capturing images (from the air) and processing the images as described herein. Similarly, the imaging device 102 may be integrated into a body worn camera as part of a public safety personal area network (PAN) or deployed as part of or in place of a dashboard camera in a public safety vehicle. In another example, the imaging device 102 may be integrated into an autonomous vehicle to provide near real-time temperature measurements of the driving environment to the vehicle's control systems.

As noted, existing thermal imaging systems rely on users to manually enter emissivity values, static regions of interest, or both in order to measure temperature. Such thermal imaging systems are therefore unable to measure temperature for different types of objects within changing environments.

Figure 3:
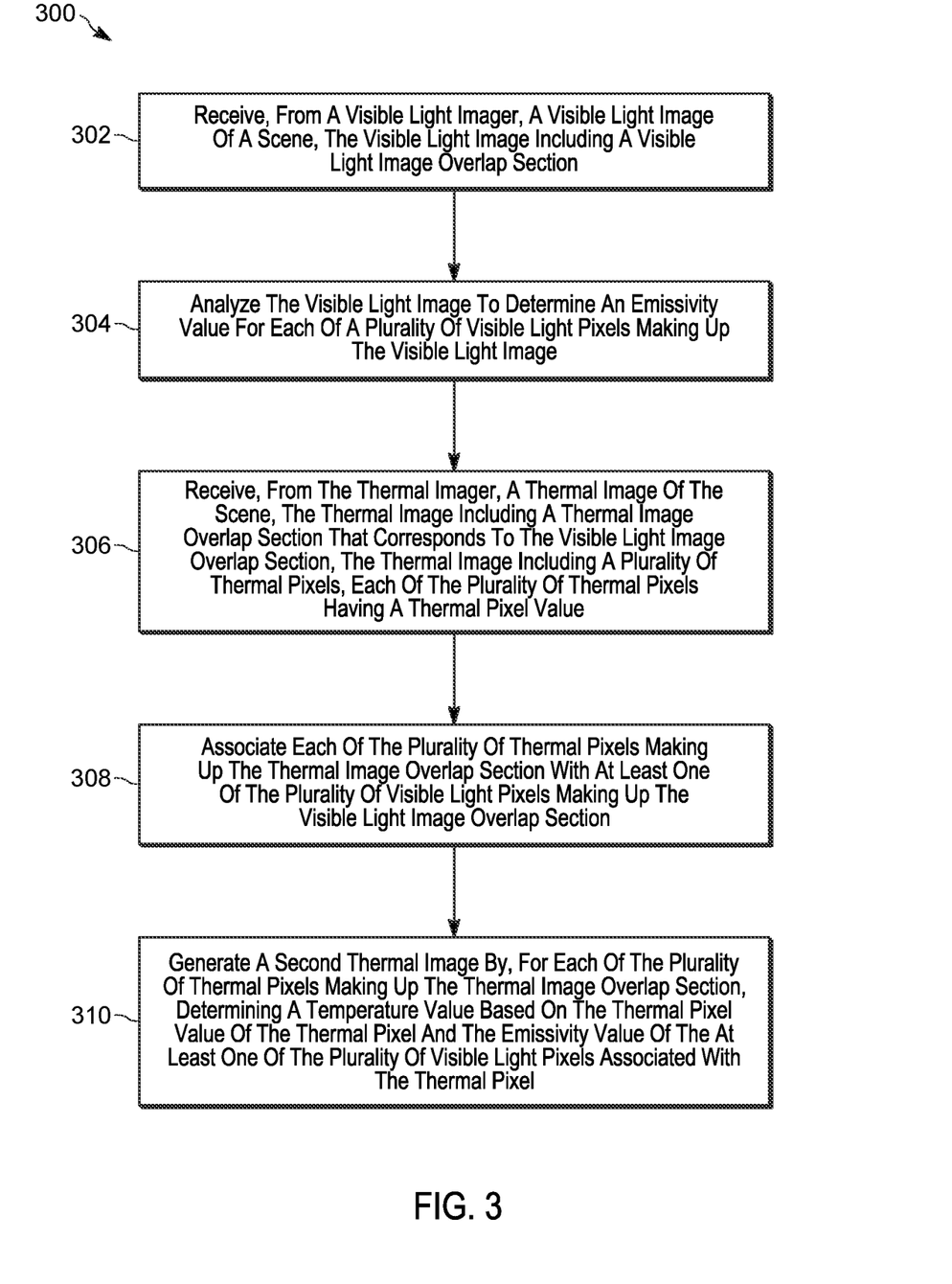
FIG. 3 is a flowchart illustrating a method for dynamic radiometric thermal imaging compensation in accordance with some embodiments.

Accordingly, FIG. 3 illustrates an example method 300 for dynamic radiometric thermal imaging compensation. Although the method 300 is described in conjunction with the imaging device 102 as described herein, the method 300 could be used with other systems and devices (for example, the system 100). In addition, the method 300 may be modified or performed differently than the specific example provided.

As an example, the method 300 is described as being performed by imaging device 102 and, in particular, the electronic processor 205. However, it should be understood that, in some embodiments, portions of the method 300 may be performed by other devices, including for example, the server 104 of the system 100. Additional electronic processors may also be included in the imaging device 102, the server 104, or both, that perform all or a portion of the method 300. For ease of description, the method 300 is described in terms of a single scene and a single imaging device. However, the method 300 may be applied to multiple imaging devices capturing images of one or more scenes.

Figure 4:
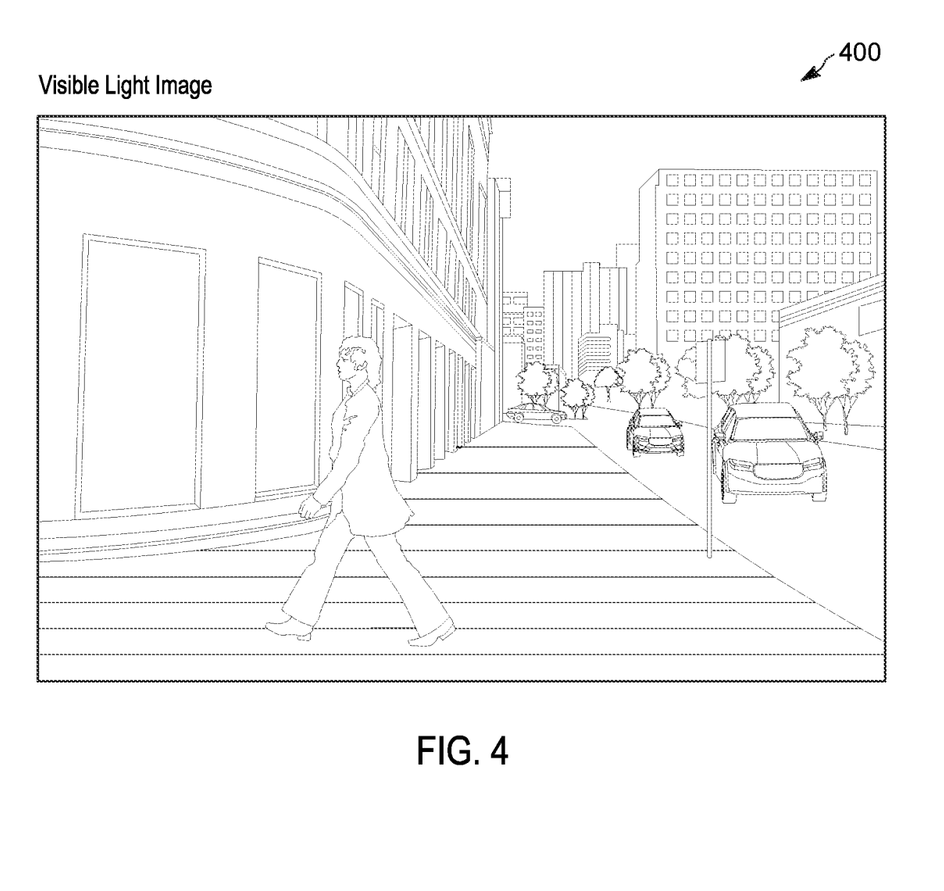
FIG. 4 illustrates an example visible light image produced using the imaging device of FIG. 2 in accordance with some embodiments.

At block 302, the electronic processor 205 receives, from the visible light imager 240, a visible light image of a scene (for example, as illustrated in FIG. 1, the scene 114). In some embodiments, the electronic processor 205 receives a digital image file, which has been produced by the visible light imager 240. In some embodiments, the electronic processor 205 receives and processes raw sensor data, which, when processed, produces the visible light image. FIG. 4 illustrates an example visible light image 400, which corresponds to the scene 114.

The visible light image is made up of a plurality of visible light pixels. At block 304, the electronic processor 205 analyzes the visible light image to determine an emissivity value for each of the plurality of visible light pixels making up the visible light image. Each pixel's emissivity value corresponds to the emissivity ratio for a material depicted by the visible light pixel. Emissivity ratios may be determined by searching a database or lookup table for a material type and retrieving the corresponding emissivity percentage. In some embodiments, the imaging device 102 stores the emissivity data locally. In some embodiments, the imaging device 102 retrieves the emissivity values from a remote source (for example, the server 104 or the database 106) via one or more intervening networks.

To determine the material types present in the visible light image, the electronic processor 205 performs a pixel level scene analysis. For example, the electronic processor 205 may use computer vision image processing techniques to perform object and component detection and pixel level segmentation. In one example, the electronic processor 205 may identify and classify an object in the visible light image as an automobile, and further detect and classify components of the automobile such as, for example, tires, wheels, window, and body panels. Performing pixel level segmentation, the electronic processor 205 assigns and classifies the pixels making up those components, for example, assigning some pixels to the rubber on the tires, some pixels to the metal on the wheels, some pixels to the glass of the windows, and some pixels to the sheet metal of the body panels. The electronic processor 205 determines an emissivity value for each of the various assigned pixels based on the pixel's assigned material type.

In some embodiments, the electronic processor 205 analyzes the visible light image using a convolutional neural network (CNN) to perform semantic image segmentation on the visible light image to assign a class to each of the plurality of visible light pixels making up the visible light image. In some embodiments, the class is the material type for the object the pixel represents in the visible light image. For example, as noted above, the CNN may be used to detect the components of an automobile and their respective material types. In another example, the object detected may be a human being and the components of the object may be portions of the body. For example, the CNN may identify head and hands as having the material type of "human skin," the torso and limbs as having material types based on the type of clothing detected covering those portions.

Figure 6:
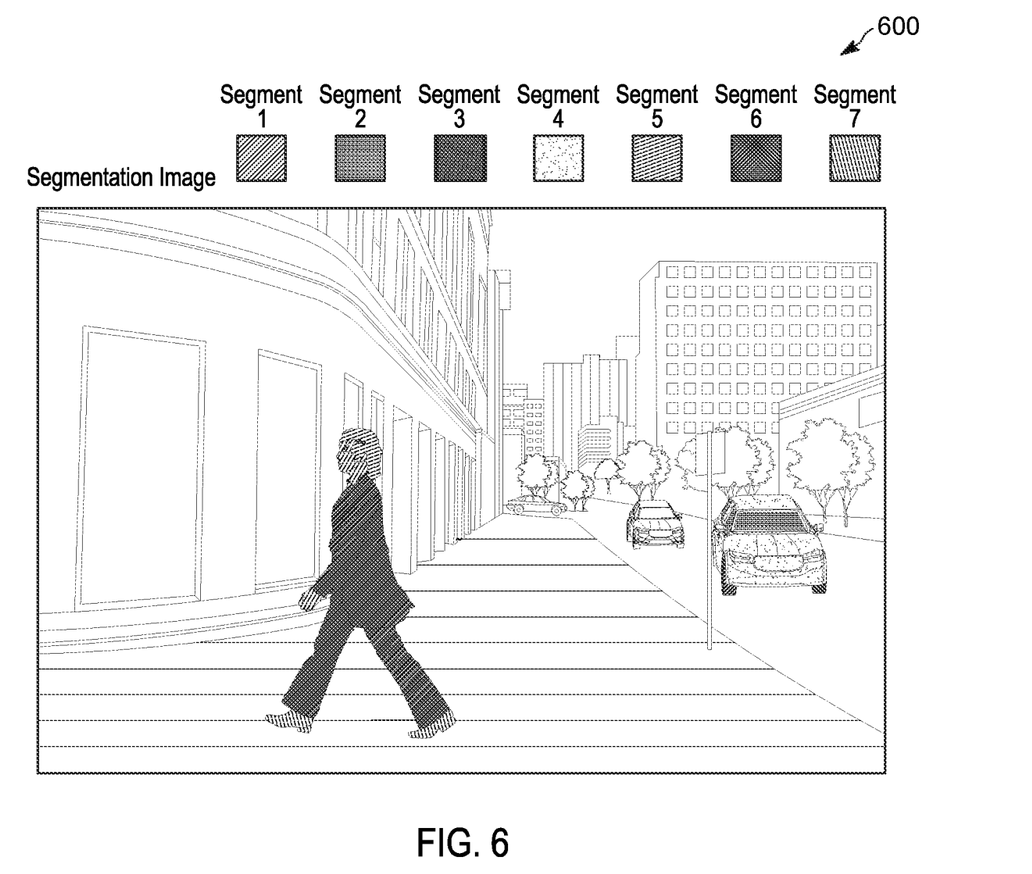
FIG. 6 illustrates an example segmentation image produced according to the method of FIG. 3 in accordance with some embodiments.

FIG. 6 illustrates an example segmentation image 600 to represent the segmentation process visually. For example, in the image 600, the electronic processor 205 has identified Segment 2, corresponding to the windshield of an automobile, Segment 4, corresponding to the metallic body of the automobile, and Segment 6, corresponding to the tires of the automobile. The electronic processor 205 has also identified Segment 1, corresponding to the exposed skin of a human being, Segment 3 corresponding to the clothing of the human being, Segment 5 corresponding to the hair of the human being, and Segment 7, corresponding to the footwear of the human being. For ease of description, the segmentation image 600 illustrates only seven Segment types. During actual image segmentation, nearly the entire image would be classified into segments.

Returning to FIG. 3, the electronic processor 205 determines the emissivity value for each of the plurality of visible light pixels making up the visible light image based on the class assigned to the pixel. For example, where the class represents the material type as described above, the electronic processor 205 may search a database or lookup table using the assigned classes to retrieve the corresponding emissivity values.

In some embodiments, the CNN is trained to determine emissivity values. For example, the CNN may be trained with a training set of visible light images and labels for each pixel of the images. In some embodiments, the labels may include emissivity values for each pixel. In such embodiments, the CNN is trained to determine emissivity values directly from captured visible light images. In such embodiments, the CNN is trained to determine emissivity values indirectly from captured visible light images. For example, in some embodiments, the CNN is trained with a training set of visible light images and corresponding object and object segments present in the images. In other embodiments, the CNN is trained with a training set of visible light images and corresponding material types for the object and object segments present in the images. Training data may be available in public data sets or may be created for purposes of training the CNN.

Temperature measurement may also be affected by the distance of the imaging device 102 from the object being measured and the angle of the imaging device 102 relative to the object. Accordingly, in some embodiments, the electronic processor 205 analyzes the visible light image to detect an object in the scene and estimates a distance between the device and the object and an angle relative to the device for the object. To estimate distance and angle, the electronic processor 205 may utilize structure from motion methods, stereoscopic imaging, sensor data, using a trained convolutional neural network, or a combination of approaches. In such embodiments, the electronic processor 205 determines the emissivity values for the visible light pixels based on the distance and the angle, using known equations to adjust the emissivity values assigned to the visible light pixels based on material type to compensate for the distance and angle.

In some embodiments, the electronic processor 205 determines the emissivity values for the visible light pixels based on an ambient condition value for the scene. For example, the emissivity values assigned to the visible light pixels based on material type is adjusted to compensate for an atmospheric pressure value, an ambient temperature value, a relative humidity value, or combinations of the foregoing. In some embodiments, the electronic processor 205 senses the ambient conditions directly (for example, using the sensor array 245). Alternatively, or in addition, the electronic processor 205 determines a geographic location for the scene (for example, using a GPS receiver for the imaging device 102) and determines the ambient condition value for the scene based on the geographic location. For example, the electronic processor 205 may query a remote weather source for current conditions at its location.

At block 306, the electronic processor 205 receives, from the thermal imager 235, a thermal image of the scene. In some embodiments, the electronic processor 205 receives a digital image file, which has been produced by the thermal imager 235. In some embodiments, the electronic processor 205 receives and processes raw sensor data, which, when processed, produces the thermal image.

Figure 5:
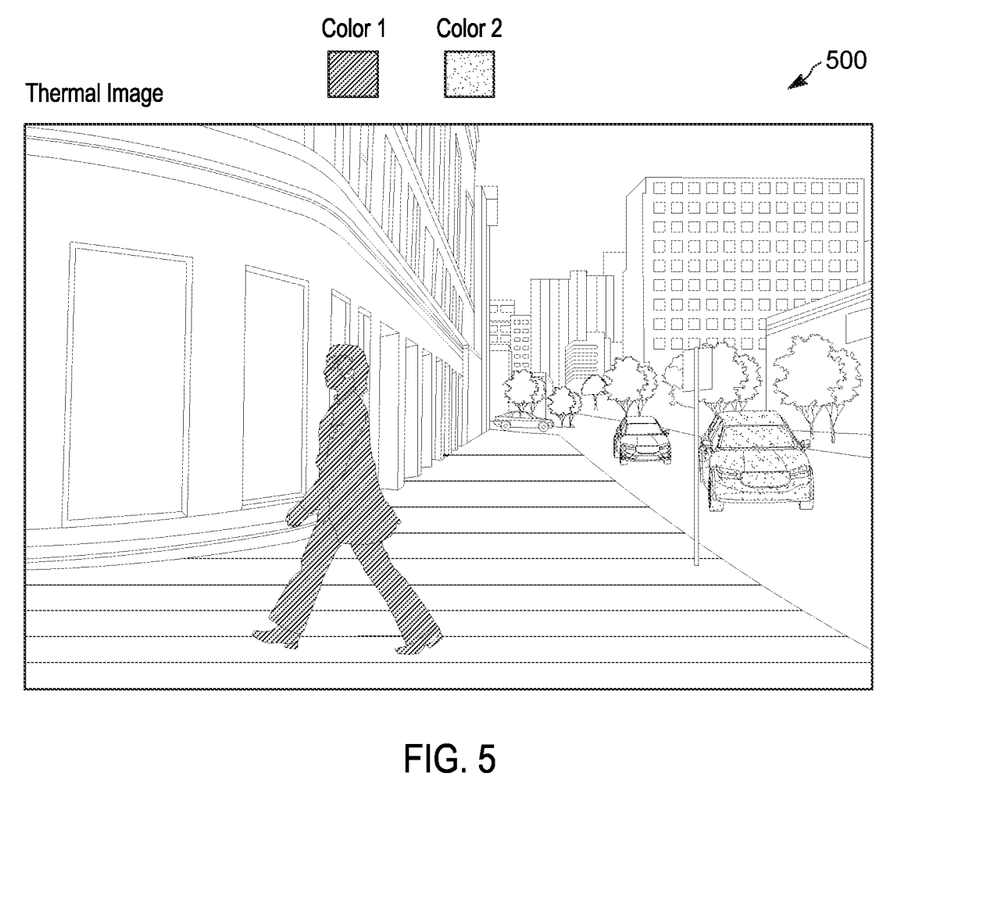
FIG. 5 illustrates an example thermal image produced using the imaging device of FIG. 2 in accordance with some embodiments.

The thermal image corresponds to the visible light image of the scene. For example, the visible light image and the thermal image are captured at the same time and, as noted herein, have overlapping fields of view. The overlapping fields of view result in the thermal imager 235 and the visible light imager 240 capturing, in their respective images, the same portion of the scene. The portion is depicted in both a visible light image overlap section of the visible image and a thermal image overlap section of the thermal image. The thermal image is made up of a plurality of thermal pixels. Each of the plurality of thermal pixels has a thermal pixel value based on the sensed level of infrared radiation. For example, as illustrated in FIG. 5, the simplified thermal image 500 includes thermal pixels in one of two colors (Color 1 and Color 2), which each correspond to a different thermal pixel value. For ease of description, the thermal image 500 includes only two sets of thermal pixels covering relatively large objects (a human being and a vehicle), each in a single color. In an actual thermal image, nearly the entire image would consist of thermal pixels in varying colors depending on their thermal pixel values.

At block 308, the electronic processor 205 associates each of the plurality of thermal pixels making up the thermal image overlap section with at least one of the plurality of visible light pixels making up the visible light image overlap section. In some embodiments, the thermal imager 235 and the visible light imager 240 have identical resolutions and may be calibrated to ensure that each pixel location in an image or image overlap section produced by one corresponds to the same pixel location in the corresponding image or image overlap section from the other. In some embodiments, the thermal imager 235 may have a lower resolution than the visible light imager 240. When the visible light image and the thermal image are aligned, multiple visible light pixels may be associated with a single thermal pixel. In such embodiments, the electronic processor 205 determines, for each of the thermal pixels, which group (i.e., two or more) of the plurality of visible light pixels are associated with the thermal pixel.

Figure 7:
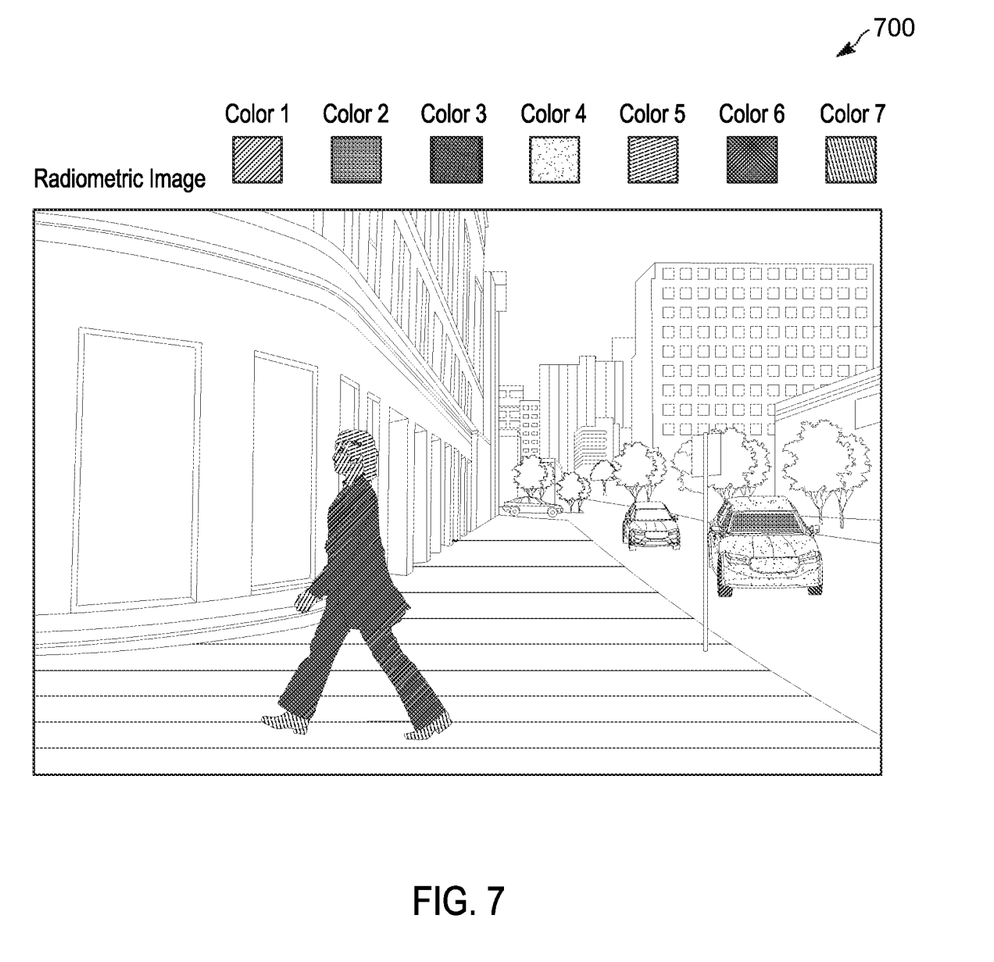
FIG. 7 illustrates an example radiometric image produced according to the method of FIG. 3 in accordance with some embodiments.

At block 310, the electronic processor 205 generates a second thermal image, where each pixel represents an actual temperature of the object in the image (e.g., a radiometric thermal image). The electronic processor 205 generates the second thermal image using the thermal image and emissivity values determined for the visible light image. FIG. 7 illustrates an example radiometric image 700. For example, in the image 700, the human being, rather than being represented by a single color as illustrated in FIG. 5, is displayed using Colors 1, 3, 5, and 7, each representing a different actual temperature based on the emissivity values determined above. Similarly, the vehicle, rather than being represented by a single color as illustrated in FIG. 5, is displayed using Colors 2, 4, and 6, each representing a different actual temperature based on the emissivity values determined above. For ease of description, the radiometric image 700 is simplified and displays only the human being and the vehicle radiometrically.

To produce the second thermal image, for each of the plurality of thermal pixels, the electronic processor 205 determines a temperature value based on the thermal pixel value of the thermal pixel and the emissivity value of the at least one of the plurality of visible light pixels associated with the thermal pixel.

For example, where each thermal pixel is associated with a group of visible light pixels, the electronic processor 205 determines a group emissivity value for the group of visible light pixels associated with the thermal pixel. The group emissivity value is based on the emissivity values assigned to the individual visible light pixels (at block 304). For example, the electronic processor 205 calculates the mean of the assigned emissivity values for the group of visible light pixels. In some embodiments, the group emissivity is a median value of the assigned emissivity values for the group of visible light pixels. In some embodiments, the electronic processor 205 determines and excludes outlier values from its calculation of the group emissivity value. Having determined the group emissivity value, the electronic processor 205, using known techniques, calculates the temperature value for the thermal pixel based on its thermal value and the group emissivity value.

In some embodiments, the electronic processor 205 may create the radiometric output at the relatively higher resolution of the visible light imager, rather than at the typically lower resolution of the thermal imager. For example, the second thermal image may be generated at a higher resolution using the visible light image as the base image. In such embodiments, the electronic processor 205 assigns the temperature value determined for a thermal pixel to each of the group of visible light pixels associated with the thermal pixel. In such embodiments, the resulting radiometric image has the same resolution as the original visible light image.

In some embodiments, the imaging device 102 is communicatively coupled to an electronic display (for example, a display integrated into the imaging device 102 or a remote display). The electronic processor 205 is configured to present, on the display, the second thermal image.

In some embodiments, the electronic processor 205 is configured to perform the method 300 for individual images captured on demand or periodically. In some embodiments, the electronic processor 205 is configured to perform the method 300 repeatedly for images captured as part of a video stream to produce, for example, a video stream of compensated radiometric images. In some embodiments, the electronic processor 205 is configured to perform temporal smoothing on video streams of compensated radiometric images. In but one example, temporal smoothing may be performed for video streams depicting static environments (for example, when monitoring an electrical transformer for heat buildup).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. An electronic imaging device comprising:
a thermal imager having a first field of view;
a visible light imager having a second field of view overlapping the first field of view;
an electronic processor coupled the thermal imager and the visible light imager and configured to:
receive, from the visible light imager, a visible light image of a scene, the visible light image including a visible light image overlap section;
analyze the visible light image by using a convolutional neural network to perform semantic image segmentation on the visible light image to assign a material type to each of a plurality of visible light pixels making up the visible light image;
determine an emissivity value for each of the plurality of visible light pixels making up the visible light image based on the material type assigned to the visible light pixel, wherein the emissivity value corresponds to an emissivity ratio for the material type;
receive, from the thermal imager, a thermal image of the scene, the thermal image including a thermal image overlap section that corresponds to the visible light image overlap section, the thermal image including a plurality of thermal pixels, each of the plurality of thermal pixels having a thermal pixel value;
associate each of the plurality of thermal pixels making up the thermal image overlap section with at least one of the plurality of visible light pixels making up the visible light image overlap section; and
generate a second thermal image by, for each of the plurality of thermal pixels making up the thermal image overlap section, determining a temperature value based on the thermal pixel value of the thermal pixel and the emissivity value of the at least one of the plurality of visible light pixels associated with the thermal pixel.

2. The device of claim 1, wherein the electronic processor is configured to:
analyze the visible light image to detect an object in the scene;
estimate a distance between the device and the object and an angle relative to the device for the object; and
determine the emissivity value for each of the plurality of visible light pixels that make up the object based on the distance and the angle.

3. The device of claim 1, wherein the electronic processor is configured to:
determine an emissivity value for each of a plurality of visible light pixels making up the visible light image based on an ambient condition value for the scene;
wherein the ambient condition value is one selected from the group consisting of an atmospheric pressure value, an ambient temperature value, and a relative humidity value.

4. The device of claim 3, wherein the electronic processor is configured to:
determine a geographic location for the scene; and
determine, based on the geographic location for the scene, the ambient condition value for the scene.

5. The device of claim 1, wherein the electronic processor is configured to:
for each of the plurality of thermal pixels making up the thermal image overlap section, determine a group emissivity value based on the emissivity values for two or more of the plurality of visible light pixels associated with the thermal pixel; and
generate the second thermal image based on the group emissivity value.

6. The device of claim 1, wherein the second thermal image is a radiometric thermal image.

7. The device of claim 1, wherein thermal image of the scene does not include a blackbody.

8. The device of claim 1, further comprising:
an electronic display communicatively coupled to the electronic processor, wherein the electronic processor is configured to present, on the display, the second thermal image.

9. A method for dynamic radiometric thermal imaging compensation, the method comprising:
receiving, from a visible light imager having a first field of view, a visible light image of a scene, the visible light image including a visible light image overlap section;
analyzing the visible light image using a convolutional neural network to perform semantic image segmentation on the visible light image to assign a material type to each of the plurality of visible light pixels making up the visible light image;
determining an emissivity value for each of the plurality of visible light pixels making up the visible light image based on the material type assigned to the visible light pixel;
receiving, from a thermal imager having a second field of view overlapping the first field of view, a thermal image of the scene, the thermal image including a thermal image overlap section that corresponds to the visible light image overlap section, the thermal image including a plurality of thermal pixels, each of the plurality of thermal pixels having a thermal pixel value;
associating, with the electronic processor, each of the plurality of thermal pixels making up the thermal image overlap section with at least one of the plurality of visible light pixels making up the visible light image overlap section; and
generating, with the electronic processor, a second thermal image by, for each of the plurality of thermal pixels making up the thermal image overlap section, determining a temperature value based on the thermal pixel value of the thermal pixel and the emissivity value of the at least one of the plurality of visible light pixels associated with the thermal pixel.

10. The method of claim 9, further comprising:
analyzing the visible light image to detect an object in the scene;
estimating a distance between the thermal imager and the object and an angle relative to the thermal imager for the object; and
determining the emissivity value for each of the plurality of visible light pixels that make up the object based on the distance and the angle.

11. The method of claim 9, further comprising:
determining an emissivity value for each of a plurality of visible light pixels making up the visible light image based on an ambient condition value for the scene;
wherein the ambient condition value is one selected from the group consisting of an atmospheric pressure value, an ambient temperature value, and a relative humidity value.

12. The method of claim 11, further comprising:
determining a geographic location for the scene; and
determining, based on the geographic location for the scene, the ambient condition value for the scene.

13. The method of claim 9, further comprising:
- determining, for each of the plurality of thermal pixels making up the thermal image overlap section, a group emissivity value based on the emissivity values for two or more of the plurality of visible light pixels associated with the thermal pixel;
- wherein generating the second thermal image includes generating the second thermal image based on the group emissivity value.

14. The method of claim 9, wherein generating the second thermal image includes generating a radiometric thermal image.

15. The method of claim 9, wherein receiving, from a thermal imager, the thermal image of the scene includes receiving a thermal image that does not include a blackbody.

16. The method of claim 9, further comprising:
- presenting, on an electronic display, the second thermal image.

17. An unmanned aerial vehicle comprising:
- a thermal imager having a first field of view;
- a visible light imager having a second field of view overlapping the first field of view;
- an electronic processor coupled the thermal imager and the visible light imager and configured to:
- receive, from the visible light imager, a visible light image of a scene, the visible light image including a visible light image overlap section;
- analyze the visible light image by using a convolutional neural network to perform semantic image segmentation on the visible light image to assign a material type to each of the plurality of visible light pixels making up the visible light image;
- determine an emissivity value for each of the plurality of visible light pixels making up the visible light image based on the material type assigned to the visible light pixel;
- receive, from the thermal imager, a thermal image of the scene, the thermal image including a thermal image overlap section that corresponds to the visible light image overlap section, the thermal image including a plurality of thermal pixels, each of the plurality of thermal pixels having a thermal pixel value;
- associate each of the plurality of thermal pixels making up the thermal image overlap section with at least one of the plurality of visible light pixels making up the visible light image overlap section; and
- generate a second thermal image by, for each of the plurality of thermal pixels making up the thermal image overlap section, determining a temperature value based on the thermal pixel value of the thermal pixel and the emissivity value of the at least one of the plurality of visible light pixels associated with the thermal pixel.

18. The unmanned aerial vehicle of claim 17, wherein the electronic processor is configured to:
- analyze the visible light image to detect an object in the scene;
- estimate a distance between the device and the object and an angle relative to the device for the object; and
- determine the emissivity value for each of the plurality of visible light pixels that make up the object based on the distance and the angle.

19. The unmanned aerial vehicle of claim 17, wherein the electronic processor is configured to:
- determine an emissivity value for each of a plurality of visible light pixels making up the visible light image based on an ambient condition value for the scene;
- wherein the ambient condition value is one selected from the group consisting of an atmospheric pressure value, an ambient temperature value, and a relative humidity value.

20. The unmanned aerial vehicle of claim 19, wherein the electronic processor is configured to:
- determine a geographic location for the scene; and
- determine, based on the geographic location for the scene, the ambient condition value for the scene.

\* \* \* \* \*